United States Patent [19]
Wilson

[11] 3,854,733
[45] Dec. 17, 1974

[54] SHAFT SEAL
[75] Inventor: Roy E. Wilson, Milwaukee, Wis.
[73] Assignee: Allen-Bradley Company, Milwaukee, Wis.
[22] Filed: July 24, 1972
[21] Appl. No.: 274,555

[52] U.S. Cl. ............... 277/82, 277/95, 277/209, 308/187.1
[51] Int. Cl. ............................................. F16j 9/00
[58] Field of Search ............ 277/95, 94, 81 R, 205, 277/209, 207, 211, 82; 308/187.1, 187.2

[56] References Cited
UNITED STATES PATENTS

| | | | |
|---|---|---|---|
| 2,396,491 | 3/1946 | Chamberlain | 277/211 X |
| 2,924,472 | 2/1960 | Bush | 277/209 |
| 3,104,884 | 9/1963 | Kerlin | 277/209 X |
| 3,154,310 | 10/1964 | Hamano | 277/209 UX |
| 3,630,533 | 12/1971 | Butler et al. | 277/205 |
| 3,705,728 | 12/1972 | Millar | 277/81 R |

Primary Examiner—Samuel B. Rothberg
Attorney, Agent, or Firm—Quarles & Brady

[57] ABSTRACT

A seal for a rotary shaft extending through a bushing that has a sleeve in an annular space between the shaft and the bushing, and a flange projecting radially outward from one end of the sleeve that includes a circumferential lip turning back over the sleeve to fit around an edge of the bushing. The sleeve has a plurality of axially spaced, annular sealing ribs projecting radially inward from its inner surface and a plurality of axially spaced, annular pressure ridges projecting radially outward from its exterior surface. The ribs and ridges are in offset axial relation with respect to one another, and the sleeve portion with ribs and ridges is radially compressed when inserted between the bushing and shaft to develop sufficient sealing forces without creation of excessive drag opposing shaft rotation.

6 Claims, 6 Drawing Figures

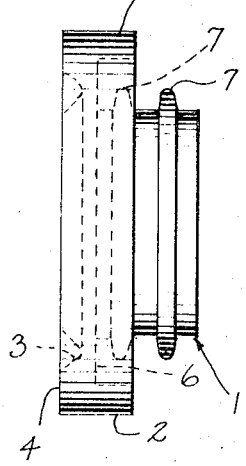
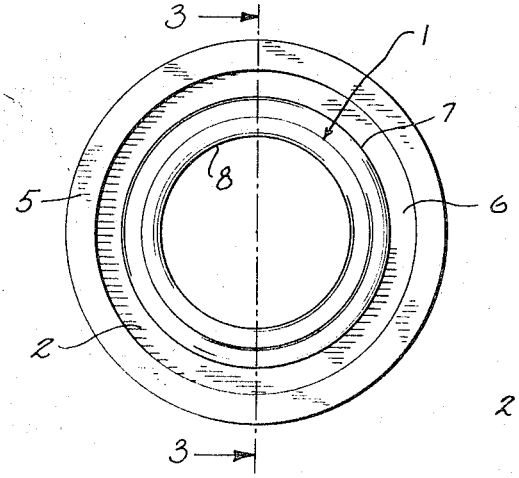
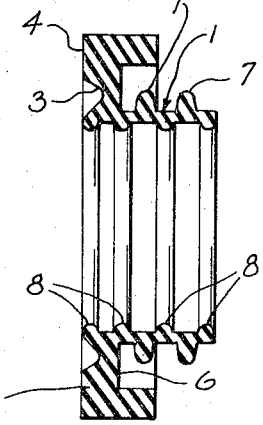
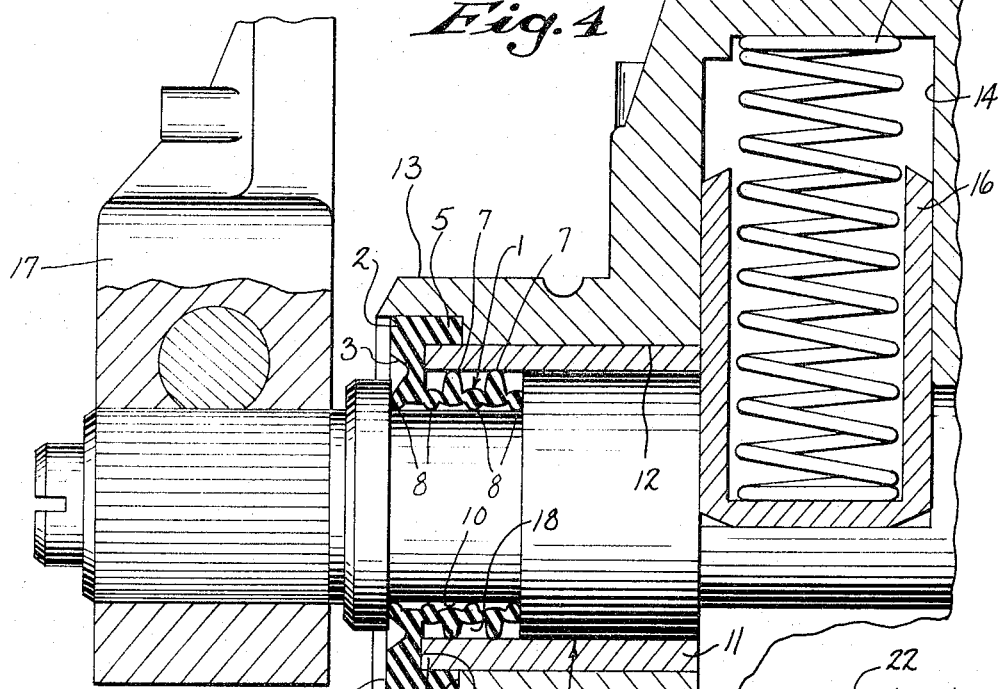
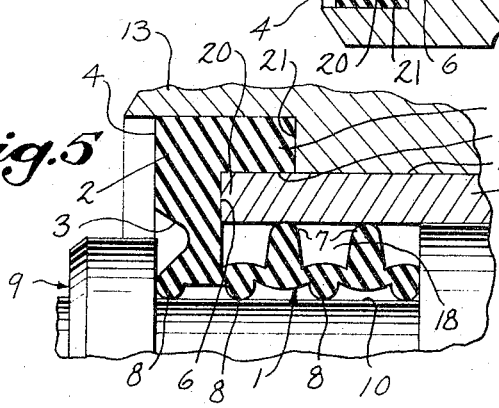
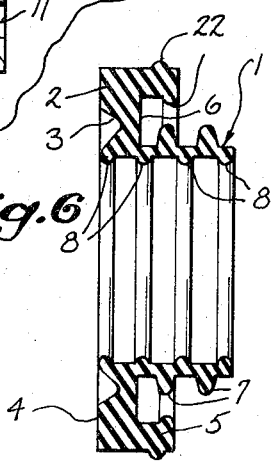

SHAFT SEAL

BACKGROUND OF THE INVENTION

The field to which this invention pertains is the art of sealing openings through which rotary shafts protrude, and more specifically to seals that do not develop excessive retarding torques opposing rotation of the shafts. An example of such a shaft is found in oil-tight housings for limit switches, wherein a seal must effectively preclude oils, cooling fluids, and other contaminants from entering the switch without gripping the shaft so tight as to develop undue retardation of shaft rotation.

Rocking of the shaft in a limit switch or a precision type control switch to effect switch actuation is resisted by frictional drag exerted on the shaft by the shaft seal in the form of sealing pressure. Such resistance can be significant where net operating forces are low, or where small increments of change in load are imposed on the switch in order to effect switch operation. Hence, in many applications of sealing a rotatable shaft with the wall of a surrounding aperture through which it extends, it is important that the particular seal employed offers a high degree of sealing effectiveness with minimal pressure upon the shaft. In the past, seals available for rockable or rotary type shafts in precision type switches having low biasing torques have not generally been satisfactory for two reasons: (i) If the seal is effective, its drag is excessive, thus countering too much of the biasing torque; and (ii) If the drag produced by the seal is light, its sealing property is considerably reduced. O-rings are commonly used as the sealing device for such shafts, but they are not entirely suitable for developing light, but effective sealing forces. This is due, in part, to the fact that a relatively small compression of an O-ring develops a large seal pressure, whereby it is difficult to control the pressure so as to maintain it at a low value without diminishing below prescribed minimums. It would be desirable to have a seal that maintains a sealing force of light, but effective value, for a substantial compression of the seal.

Another problem in sealing rotary shafts, in equipment subjected to oils and other fluids, occurs when porous bearings are employed. Bearings formed from sintered powdered metal frequently display such porous characteristics, and fluid contaminants must be prevented from bypassing the shaft seal through absorption by the bearing, so as to wick around the seal. A standard O-ring will not prevent this type of action, nor will other type seals that have a sealing effectiveness solely dependent upon the sealing pressure they exert. In such instances, to be fully effective, a seal must prevent fluid contaminants from coming in contact with the bearing itself, and this requires a complex seal configuration that includes not only the insertion of a sealing portion between the shaft and bearing, but also some shielding portion about the exposed surfaces of the bearing.

The use of a bearing for journaling the shaft through the housing wall may also decrease the effective sealing of the housing if the interface between the bearing and the wall is not entirely leakproof. Again, any leakage into the housing occurring through this interface is not affected by the sealing pressure exerted by the seal, and additional structure must be included in the seal construction to insure against this type of leakage.

Sealing devices heretofore known have not always satisfactorily maintained the oil-tight integrity of their associated housing in instances posing the above problems. It is these problems to which the present invention is directed.

SUMMARY OF THE INVENTION

The present invention relates to a seal for a rotary shaft extending through an opening, and it more particularly resides in a seal with a sleeve having at least one annular sealing rib and one annular pressure ridge formed on opposite sides of the sleeve, with the rib being axially offset with respect to the ridge. The sleeve is designed to be disposed in an annular space between the shaft and a wall of the opening to surround a portion of the shaft and, when relaxed, the radial depth of the sleeve, as measured between the vertices of the rib and ridge is greater than the radial extent of said annular space, so that when the seal is inserted into this space it is compressed to seal the rib and ridge against the shaft and the wall with a portion of the sleeve extending axially between the rib and ridge being under a state of flex.

A preferred form of the invention is adapted to seal the shaft with a bushing fitted in a housing wall. The shaft extends through an opening in the bushing with a bearing portion of the shaft journaled in one end of the opening and an adjacent portion of the shaft spaced inward from the bushing wall. The seal sleeve surrounds the adjacent portion of the shaft, to lie between the shaft and the bushing. The sleeve is formed with a plurality of spaced pressure ridges projecting outward to abut the bushing, and with a plurality of spaced sealing ribs projecting inward to abut the shaft. The ribs are in an offset axial relation with respect to the pressure ridges, and the ridges when relaxed have a diameter greater than the diameter of the bushing opening to have a compressed fit therein that urges the sleeve and ribs inwardly. The axial spacing of the ribs and ridges causes the sleeve to bridge, or span between these components, whereby a flexing of the sleeve occurs along its length to produce a light sealing pressure by the ribs on the shaft while maintaining effective sealing. This flexing of the sleeve along its length permits relatively fine control of the sealing pressure exerted upon the shaft.

To prevent absorption of fluid contaminants by the bushing, and resulting wicking through the bushing, an annular flange projects radially outward from one end of the sleeve to snugly wrap around an edge of the bushing. In this way, the bushing is completely shielded from the fluid contaminants.

It is an object of the invention to provide a seal for a rotary shaft that permits adequate sealing for the shaft without producing excessive frictional drag on the shaft.

It is another object to provide a seal for a rotary shaft that has a sleeve bridging between pressure ridges and ribs to permit deformation of the seal when under compression so that the sealing pressure exerted on the shaft is relatively stable over a range of radial compression of the seal.

It is yet another object to provide a seal for a rotary shaft that has an exceptionally long operating life span due to its exertion of a minimal sealing pressure on the shaft.

It is still another object to provide a seal for a rotary shaft with an annular flange that wraps around the edge of a porous bushing through which the shaft extends, to shield the bushing from absorbing fluid contaminants, and to also mask the entrance to the interface between the bushing and the wall of an opening in which it is fitted.

The foregoing and other objects and advantages of the invention will appear from the following description. In the description reference is made to the accompanying drawing which forms a part hereof, and in which there is shown by way of illustration and not of limitation specific forms in which the invention may be embodied. Such embodiments do not represent the full scope of the invention, but rather the invention may be employed in a variety of forms, and reference is made to the claims herein for interpreting the breadth of the invention.

BRIEF DESCRIPTION OF THE DRAWING

FIG. 1 is a side view in elevation of a preferred embodiment of the seal of the present invention;

FIG. 2 is a rear end view in elevation of the seal of FIG. 1;

FIG. 3 is a view in section of the seal of FIG. 1 taken through the plane 3—3 indicated in FIG. 2;

FIG. 4 is a fragmentary view in section of a portion of a limit switch showing the seal of FIG. 1 mounted within such switch;

FIG. 5 is an enlarged fragmentary view in section of the seal mounted as shown in FIG. 4; and FIG. 6 is a view in section similar to FIG. 3 of a modification of the seal of FIG. 1.

DESCRIPTION OF THE PREFERRED EMBODIMENTS

Referring now to the seal of FIGS. 1-3 of the drawings, it is molded as a single member from a resilient material and has a sleeve 1 serving as a body portion with an annular flange 2 projecting radially outward from the front end of the sleeve 1 to serve as a head portion. The flange 2 is molded with an annular groove 3 in its front face 4 to increase the flexibility of the forward end portion of the sleeve 1 from which the flange 2 projects. A lip 5 protrudes rearward from the circumferential margin of a rear face 6 of the flange 2, to thereby extend in an overhanging relation with the sleeve 1.

Two axially spaced, annular pressure ridges 7 are formed integrally on the sleeve 1 to project radially outward from the sleeve exterior surface. One such ridge 7 is positioned near the mid-point of the length of the sleeve 1 and is shrouded by the lip 5, while the other ridge 7 is formed toward the rear of the sleeve 1. The two ridges 7 are also located on the sleeve 1 in positions at the mid-points between three of a set of four axially spaced, annular sealing ribs 8 that project radially inward from the interior surface of the sleeve 1. There is a rib 8 at each end of the sleeve interior surface, and the remaining two ribs 8 are spaced therebetween to lie axially on each side of the pressure ridge 7 at the mid-point of the sleeve 1. The ribs 8 are integral with the sleeve 1, similarly as are the ridges 7, and there is created a staggered relationshsip between the ridges 7 and three of the ribs 8, with the sleeve 1 spanning between ribs and ridges in a bridge-like fashion.

The seal is preferably formed from an elastomeric copolymer, known generally by its trademark Buna-N, with a durometer rating of 50–60 Shore A, but it may be constructed from other known resilient materials, including plastics, having necessary resilient properties. The seal is designed to be employed with a rotary or rockable shaft that extends through an opening in a wall of a sealed housing for a limit switch and the like, to seal the shaft with the wall.

To illustrate the use and sealing action of the present invention, the seal of FIGS. 1-3 is shown in FIGS. 4 and 5 in a shaft opening for an oil-tight limit switch. A rockable operating shaft 9 with an annular groove 10 extends through a wall of the switch housing. A bearing portion of the shaft 9 is journaled in the opening of a bushing 11 formed from sintered powdered brass. The bushing 11 may be cast in place in an aperture 12 of a hub 13 protruding from the housing wall, or alternatively, it could be preformed and then pressed into position. A flat in the shaft 9 is aligned with a pocket 14 in the housing, and a shaft biasing assembly comprised of a coil spring 15 seated in a sliding socket 16 is disposed in this pocket 14. The spring 15 is partially compressed, to urge the sliding socket 16 downward into the flat of the shaft 9, so that the socket 16 acts as an abutment to prevent movement of the shaft 9 in an axial direction. The spring assembly also biases the shaft 9 to a normal angular position. However, the shaft 9 may be rocked about its axis if a sufficient operating force that overcomes the biasing effect of the spring 15 is applied to an operating lever 17 fastened on the outer end of the shaft 9.

The seal is particularly suited for use with a shaft assembly as shown in FIG. 4 because it produces only a small frictional drag countering rotation of the shaft 9. This advantage is of particular pertinence when the operating force applied on the lever 17 to rock the shaft 9 only marginally exceeds the biasing torque supplied by the spring 15. In such case if the frictional drag of the seal is greater than, or of the order of magnitude of the difference between the operating force and the countering biasing torque, the interfere can be held in its normal position notwithstanding application of the operating torque. The exertion of low frictional drag by the seal is also important in that the spring biasing assembly provides the only biasing torque to return the shaft 9 to a normal position after it has been rocked therefrom. Too great a frictional drag from the seal would impede proper biasing, but on the other hand, too little pressure exerted by the seal will considerably reduce sealing effectiveness. The present invention, with its unique configuration, overcomes the problem of maintaining a desired sealing force that does not inerfere with operating forces by providing effective sealing through the provision of staggered ridges and ribs which permit flexing in the bridging portions of the sleeve, instead of having a compression of the entire thickness of the seal, as in the case of O-rings.

Continuing with reference to FIG. 4, the sleeve 1 is seated in the annular groove 10 immediately adjacent the bearing portion of the shaft 9 to fit within an annular space 18 between the surface of the shaft 9 and the internal wall of the bushing 11. The inward protrusion of the sealing ribs 8 from the interior surface of the sleeve 1 is such that the inner diameter of the ribs 8 is nearly coincident with the diameter of the shaft 9 in the gropve 10, when the seal is in a relaxed condition prior to insertion into the assembly. The outward radial projection of the pressure ridges 7, on the other hand, is such that when the sleeve is removed from the space 18 the radial thickness from the vertex of the sealing ribs 8 to the vertex of the pressure ridges 7 is greater than the radial depth of the space 18. Thus, as indicated in FIGS. 4 and 5, the sleeve 1 is deformed when fitted into the space 18.

The pressure ridges 7 are urged downward by the internal wall of the bushing 11, and this downward pressure on the ridges 7 is transmitted through the sleeve 1 to the sealing ribs 8 positioned axially to the sides of the ridges 7, to urge these ribs 8 radially inward against the shaft 9. Due to the offset relation between the ridges 7 and the ribs 8, the inward pressure exerted on the ridges 7 produces flexing of the sleeve 1, which allows the ridges 7 and adjacent ribs 8 to move radially toward one another, as shown most clearly in FIG. 5. This movement has the effect of minimizing frictional drag exerted on the shaft 9 by the ribs 8 without significantly decreasing their effective sealing action.

This action contrasts sharply with the sealing provided by an O-ring type seal construction. The sealing provided by an O-ring comes as a result of a compression of the entire annular body of the O-ring between two walls. A small compression of the body of a typical O-ring requires a considerable amount of force being applied on the body, and the seal exerts an equal and opposite reaction force on the walls between which compression is occurring. The reaction force of an O-ring varies rapidly in magnitude in response to variation in compression, and if there is variation in tolerance or fit between parts the reaction force can easily become either too small or too large. As a result, O-ring designs usually call for a compression giving rise to a large force upon the shaft being sealed. The present invention, on the other hand, is adapted to provide a sealing action that offers a relatively wide range of seal compression without corresponding large changes in sealing pressure. With this seal construction, it is possible to mold a seal that will provide adequate, but not excessive, sealing pressure for a greater range of dimensional tolerance.

The multiple sealing of the pressure ridges 7 and sealing ribs 8 presents a highly effective barrier against the entry of foreign materials into the housing along the shaft 9, but this structure alone will not prevent migration of fluid contaminants into the housing by penetrating the porous bushing material and wicking around the sealing edges of the ridges 7. The sintered powdered bushing 11 being quite porous, can absorb fluids and allow them to bypass the obstructions presented by the pressure ridges 7. This type of leakage past the seal is prevented by the head portion of the seal, which includes the flange 2 and the overhanging lip 5.

Referring again to FIG. 4, the flange 2 is shaped so that its rear face 6 fits tight against the front edge 20 of the bushing 11. The lip 5, rear flange face 6 and sleeve 1 define a niche that accepts the front edge 20 of the bushing and forms an enclosure that shields the bushing 11 from exposure to foreign materials.

To further insure this shielding of the bushing 11, the lip 5 snugly fits into a recess 21 defined by the bushing front edge and the mouth of the aperture 12 in the hub 13. This construction presents a seal between the shaft 9 and the hub 13 where the shaft exits from the bushing 11. In this way, not only are foreign materials prevented from reaching the bushing 11, but in addition, the lip 5 overlies the entrance to the interface formed by the exterior surface of the bushing 11 and the wall of the aperture 12 closing off this interface to contaminants. The integrity of the sealing between the lip 5 and the recess 21 can be enhanced by the addition of an annular node 22 on the top and bottom sides of the lip 5, as shown in FIG. 6.

Thus, by means of a plurality of sealing features the embodiments of the invention, as shown and described, provide an improved seal for a rotary, spring biased shaft, extending through an opening in the wall of a sealed housing. The bridge-type construction of the seal sleeve 1 with its protruding ridges 7 and ribs 8 furnishes a highly effective means for sealing the shaft 9 with the wall of the opening in the bushing 11 without producing excessive frictional drag on the shaft 9 to permit proper shaft operation. As a result of the minimal sealing forces exerted by the seal on the shaft 9, the operating life of the seal is substantially enhanced.

The annular head portion of the seal comprised of the flange 2 and the lip 5 seals the shaft 9 with the porous bushing 11 by wrapping around the front edge of the bushing 11, serving as a shield from foreign materials to eliminate the problem of leakage due to wicking of such materials past the ridges 7. The lip 5, in addition to encasing the edge of the bushing 11, effectively seals off the entrance to an interface 23 between the outer surface of the bushing 11 and the wall of the aperture in which it resides.

The foregoing description of the preferred embodiments should not be viewed as the sole constructions of the present invention, for the reason that other designs may be constructed without departing from the spirit of the present invention. For example, the position of the pressure ridges 7 may be interchanged with the sealing ribs 8 so that the compressed fit of the seal is a result of the pressure ridges 7 and sleeve body 1 being forced radially outward by the shaft 9 to press the ribs 8 against the wall of the aperture in a sealing relationship. As another alternative, the ribs and ridges could be of like geometry, and each might extend, when in relaxed condition, into interference with the bushing wall and the shaft. Although the seal has been described in conjunction with a rockable shaft, the above features cooperate together to form a highly effective seal employable for many types of applications.

I claim:

1. In a seal for a shaft that extends through an opening of a member which presents an axially extending rim, a length of said shaft being smaller in diameter than said opening to have an annular space for receiving a seal, the combination of:

a resilient sleeve that encircles said shaft and is disposed in said annular space so as to be encircled in turn by the wall of said opening;

a plurality of axially spaced annular sealing ribs formed integrally on the interior surface of said sleeve to project radially inward and abut the surface of said shaft;

a plurality of axially spaced annular pressure ridges formed integrally on the exterior surface of said sleeve that are in an offset axial relation to said sealing ribs, and projecting radially outward from said sleeve to abut against the wall of said opening;

said sleeve with said integral sealing ribs and pressure ridges having a radial depth greater than the radial extent of said annular space when removed from said space, so that upon insertion in said space the ribs and ridges fit firmly against said shaft surface and said opening wall respectively with portions of said sleeve between ribs and ridges held in flexed condition; and an integral head portion for said sleeve having an annular flange projecting radially outward from one end of said sleeve, which flange has a circumferential lip extending back to overhang said sleeve to form a niche in the head portion, said niche receiving said rim of said member with a snug fit to seal said rim with said head portion.

2. A seal as in claim 1 wherein the flange of said head portion includes a front side facing in an axial direction with an annular groove therein to increase the flexibility of that end of the sleeve from which said flange projects.

3. In a seal assembly for a rotatable shaft extending through an opening in a bearing, such shaft having a bearing portion journaled in a part of said bearing and an adjacent portion spaced from the wall of the bearing opening to form an annular space, the combination of:

a solid, resilient sleeve in said annular space spaced radially from both said shaft and the wall of the opening of said bearing;

a plurality of axially spaced, annular, resilient ribs formed on the interior surface of the sleeve to project radially inward, abutting the surface of said shaft;

a plurality of axially spaced, annular, resilient ridges formed on the exterior surface of the sleeve in an offset axial relation to said sealing ribs, at least some of said pressure ridges disposed axially between two sealing ribs and having a normal diameter to project outward a radial distance greater than the diameter of said bearing opening to thereby abut the inner surface of said bearing to urge said sleeve and said sealing ribs radially inward; and a head portion on said sleeve presenting a flange extending radially outward in sealing engagement with an end of said bearing.

4. In a seal assembly for a rotatable shaft extending through an opening of a bearing, the combination of:

a rotatable shaft extending through said opening with a bearing portion journaled in a part of said bearing opening and an adjacent portion spaced from the wall of the opening to form an annular space; and a seal seated in said annular space that circumscribes said shaft and is in turn circumscribed by said bearing, which seal comprises:
a resilient sleeve extending axially of the shaft that is spaced radially from both said shaft and the wall of the opening of said bearing;
a plurality of axially spaced, annular sealing ribs formed integrally on the interior surface of the sleeve to project radially inward to abut the surface of said shaft;
a plurality of axially spaced, annular pressure ridges formed integrally on the exterior surface of the sleeve each in an offset axial relation to said sealing ribs, with the ribs and ridges being spaced alternately along the sleeve, and the ribs and ridges presenting a radial thickness greater than the depth of said annular space to thereby be compressed when inserted in said space to urge said sealing ribs inward against the shaft and said ridges against said bushing, with the sleeve portions extending axially between ribs and ridges being in a state of flex; and
an integral head portion having an annular flange projecting radially outward from one end of said sleeve, which flange fits snugly over one end of said bearing.

5. A seal as in claim 4 wherein said bearing fits in a housing wall and has an axially extending edge to form a recess with the wall, and said head portion has a lip that fits around the edge and within said recess.

6. A seal as in claim 5 wherein the top and bottom sides of the lip each have an annular node protruding therefrom so that the lip has a compressed fit in said recess.

* * * * *